United States Patent Office 3,274,216
Patented Sept. 20, 1966

3,274,216
STABILIZATION OF LACTONES
William F. Goldsmith, South Charleston, and David F. Marples, St. Albans, W. Va., assignors to Union Carbide Corporation, a corporation of New York
No Drawing. Filed Oct. 2, 1963, Ser. No. 313,188
7 Claims. (Cl. 260—343)

This application is a continuation-in-part of application, Serial No. 277,094, filed May 1, 1963, now matured to U.S. 3,227,730.

The present invention is related to the stabilization of lactones. More particularly, it is directed to the stabilization of epsilon-caprolactones against color formation, and the build-up of acidity and peroxide content, by the addition of a stabilizing combination of triorgano phosphites and alkylated phenols which result in stabilized compositions of matter heretofore unknown. The invention is particularly concerned with the stabilization of epsilon-caprolactones using a combination of triorgano phosphite and tertiary-alkyl hindered phenol.

Epsilon-caprolactones of high purity have been prepared by various routes, e.g., Jour. Am. Chem. Soc. 56, 455 (1934) as well as U.S. Patent No. 3,064,008 (1962). The purpose of these routes was to prepare epsilon-caprolactones of high purity in substantially monomeric form and which maintain a high degree of stability when stored for various lengths of time. That is, epsilon-caprolactones which do not readily polymerize, as shown by refractive indices measurements, on standing at room temperature, or higher. But, it was observed that even very highly purified samples of epsilon-caprolactones prepared via the above routes were not color stable during storage. The color formation of epsilon-caprolactones during storage was still a problem. There remained a need for a much more saleable epsilon-caprolactone product that could be stored for prolonged periods of time without color formation. Low-colored epsilon-caprolactones having low acidity are required for producing polyester-diols, e.g., a polyester-diol made from caprolactone and ethylene-glycol, and subsequent polyurethanes having optimum end-use properties.

In the past, epsilon-caprolactone made by the oxidation of cyclohexanone with peracetic acid has generally had low color and low acidity when freshly distilled, but, during storage, however, it gradually develops color and exhibits an increase in acidity and peroxide content. In a similar manner, freshly distilled epsilon-caprolactone yields low color polyester-diols whereas the same epsilon-caprolactone after storage for two weeks at room temperature yields high color polyester-diols.

Because of the aforementioned difficulties, users of epsilon-caprolactones have found it necessary to redistill even very highly purified epsilon-caprolactones prior to use. Low color polyurethanes are highly desirable, particularly in the preparattion of elastic fibers. Low acidity is necessary to prevent chain termination during preparation of polyester-diols. Low peroxide content is required to avoid discoloration during the preparation of polyester-diols and to avoid gelation during the preparation of the polyurethane.

Therefore, in order to overcome the aforementioned difficulties inherent in even highly purified epsilon-caprolactones, it has been now discovered that more color-stable epsilon-caprolactones having lower acidity and lower peroxide content can be prepared by incorporation therein of a stabilizing combination of triorgano phosphites and alkylated phenols. The epsilon-caprolactones stabilized according to this invention contain one or more triorgano phosphites and one or more alkylated phenols incorporated therein. The stabilized epsilon-caprolactones herein contain a mixture comprised of one or more triorgano phosphites and one or more alkylated phenols. In some situations, a synergistic effect has been shown by mixtures of certain alkylated phenols and triorgano phosphites in stabilizing epsilon-caprolactones according to this invention. Stabilized compositions of matter composed of an epsilon-caprolactone, a triorgano phosphite and a tertiary-alkyl hindered phenol, as defined herein, are the preferred form of this invention.

In order for epsilon-caprolactones, e.g., epsilon-caprolactone, to be eminently suitable for making polyester-diols and subsequent polyurethanes, the epsilon-caprolactone should have a low-color (10 Pt–Co, or less), a low acid number (0.1 maximum), a low peroxide content (10 parts per million maximum, as hydrogen peroxide), and a low water content (0.05 percent maximum). The stabilized compositions of this invention containing an epsilon-caprolactone and a stabilizing amount of both triorgano phosphites and alkylated phenols are very suitable for making the above noted low color, low acid and low peroxide containing polyester-diols and subsequent polyurethanes having optimum end-use properties.

Prominent among the triorgano phosphites employed as stabilizers for epsilon-caprolactones in combination with the alkylated phenols are those phosphites having a structure corresponding to the formula:

wherein R, R¹, and R² may be the same or dijerent, and each designates an alkyl, cycloalkyl, aryl, aralkyl, or alkaryl radical, preferably each containing up to about 18 carbon atoms, or slightly higher. The alkyl radicals contemplated in this respect can be either linear, branch-chained or cyclic. In addition, each of the radicals designated by R, R¹, and R² can be substituted by various substituents such as, hydroxy, alkoxy, aryloxy, carbalkoxy or acyloxy radicals. As typical of the radicals designated by R, R¹ and R² there can be mentioned methyl, ethyl, propyl, isopropyl, butyl, pentyl, hexyl, heptyl, 2-ethylhexyl, octyl, isooctyl, decyl, dodecyl, hexadecyl, octadecyl, cyclopentyl, cyclohexyl, phenyl, biphenyl, naphthyl, methylphenyl, ethylphenyl, phenylethyl, phenylhexyl, hydroxyethyl, methoxyethyl, phenoxyhexyl, carbethoxyethyl, propionoxyoctyl, benzoxyhexyl, hydroxyphenyl, methoxyphenyl, carbethoxyphenyl radicals, and the like.

Representative triorgano phosphites encompassed within this invention and suitable as stabilizers in combination with the alkylated phenols include, among others, the trialkyl phosphites such as, trimethyl phosphite, triethyl phosphite, tripropyl phosphite, triisopropyl phosphite, tributyl phosphite, triisobutyl phosphite, tripentyl phosphite, triheptyl phosphite, trihexyl phosphite, trioctyl phosphite, trinonyl phosphite, tridecyl phosphite, triisodecyl phosphite, tridodecyl phosphite, trioctadecyl phosphite, tricyclohexyl phosphite, diethyl butyl phosphite, tri(8-hydroxyoctyl)phosphites, tri(2-ethoxyethyl)phosphite, and the like; the triaryl phosphites such as, triphenyl phosphite, tri-1-naphthyl phosphite, tri-2-naphthyl phosphite, tri-1-anthryl phosphite; monoaryl dialkyl phosphites such as, phenyl dimethyl phosphite, phenyl diethyl phosphite, phenyl dipropyl phosphite, phenyl dibutyl phosphite, phenyl dipentyl phosphite, phenyl diheptyl phosphite, phenyl dihexyl phosphite, phenyl dioctyl phosphite, phenyl dinonyl phosphite, phenyl didecyl phosphite, phenyl triisodecyl phosphite, phenyl didodecyl phosphite, 1-naphthyl didecyl phosphite, and the like; and the diaryl monoalkyl phosphites such as, diphenyl methyl phosphite, diphenyl ethyl phosphite, diphenyl propyl phosphite, diphenyl butyl phosphite, diphenyl isobutyl phosphite, diphenyl pentyl phosphite, diphenyl heptyl phosphite, diphenyl hexyl phosphite, diphenyl octyl phosphite, diphenyl nonyl phosphite, diphenyl decyl phosphite, diphenyl isodecyl phosphite, diphenyl dodecyl phosphite, di-1-anthryl ethyl phosphite, and the like.

The most preferred single group of triorgano phosphites are the unsubstituted trialkyl phosphites and especially those containing alkyl groups of from about 4 to about 12 carbon atoms in each alkyl group. The most preferred single trialkyl phosphites are: tributyl phosphite, trioctyl phosphite, and tridecyl phosphite. Of these, tridecyl phosphite is the most preferred. Other preferred triorgano phosphites are the triaryl phosphite, triphenyl phosphite, and the aryl dialkyl phosphite, phenyl didecyl phosphite.

The triorgano phosphites used as stabilizers in combination with the alkyl phenols in this invention are, in general, well-known compounds. They can be prepared, for example, by methods disclosed in Organophosphorous Compounds, G. M. Kosolapoff, Wiley & Sons, Inc., New York (1950), at pages 184–185, et seq.

The alkylated phenols suitable for use in combination with the aforementioned triorgano phosphites are those having a structure corresponding to the formula:

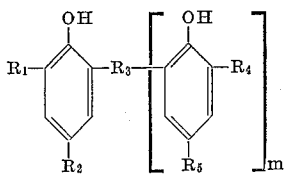

wherein $R_1$, $R_2$, $R_4$, and $R_5$ are either hydrogen, alkyl, cycloalkyl, alkoxy, hydroxy or hydroxyalkylene; $m$ has a value of from 0 to 1, inclusive; and $R_3$, depending upon the value of $m$, is either hydrogen, alkyl, alkylene, cycloalkyl, cycloalkylene, alkoxy, alkyleneoxy, hydroxy or oxy, with the proviso that at least one of the aforementioned R's must be an alkyl or alkoxy group. It may be seen from the above formula that when $m$ has a value of 0, $R_3$ is a monovalent group, e.g., alkyl, and when $m$ has a value of 1, $R_3$ is a divalent group, e.g., alkylene. The aforementioned groups susceptible to substitution designated by $R_1$–$R_5$ also can be substituted with hydroxy, alkoxy, aryloxy, carbalkoxy, acyloxy, and the like, but are preferably unsubstituted.

As typical of the groups designated by $R_1$–$R_5$ there can be mentioned methyl, ethyl, n-propyl, i-propyl, n-butyl, i-butyl, t-butyl, n-pentyl, t-pentyl, n-hexyl, t-hexyl, n-heptyl, t-heptyl, n-octyl, t-octyl, n-decyl, t-decyl, n-dodecyl, t-dodecyl, cyclopropyl, cyclobutyl, cyclopentyl, cycloheptyl, methoxy, ethoxy, propoxy, butoxy, sec-butoxy, t-butoxy, pentyloxy, hexyloxy, heptyloxy, octyloxy, decyloxy, dodecyloxy, methylene, ethylene, n-propylene, n-butylene, n-pentylene, cyclopropylene, cyclobutylene, cyclohexylene, methyleneoxy, ethyleneoxy, propyleneoxy, butyleneoxy, hydroxymethylene, and the like.

The above groups represented by $R_1$–$R_5$, preferably contain from 1 to 12 carbon atoms. The preferred groups are hydrogen, hydroxy, alkyl of from 1 to 12 carbon atoms and alkoxy of from 1 to 12 carbon atoms. The preferred compounds are those wherein $R_1$ and $R_4$ are either hydrogen, hydroxy or alkyl of from 1 to 12 carbon atoms, $R_2$ and $R_5$ are either hydroxy, alkyl or alkoxy of from 1 to 12 carbon atoms, and $R_3$ is either hydrogen, oxy, alkyl, alkoxy, or alkylene of from 1 to 12 carbon atoms, or hydroxy, and $m$ has a value of from 0 to 1, depending on the valence of $R_3$, with the proviso that at least one of the R's ($R_1$–$R_5$) must be alkyl or alkoxy.

By "alkylated phenol" as used herein is meant a phenol containing at least one phenolic hydroxy group, wherein "alkylated" is meant to include either alkyl and/or alkoxy groups. A further definition of "alkylated phenol" is found on reference to the formulas herein.

The most preferred alkylated phenols are those which can be represented by the formula:

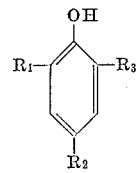

wherein $R_1$ and $R_3$ are either hydrgen or alkyl of from 3 to 8 carbon atoms, both alkyl groups branched on the alpha carbon atoms thereof, and $R_2$ is alkyl or alkoxy of from 1 to 6 carbon atoms. The most highly preferred compounds are those represented by the above formula wherein $R_1$ and $R_3$ are both either hydrogen or tertiary butyl groups, and $R_2$ is alkyl or alkoxy of from 1 to 3 carbon atoms.

Representative alkylated phenols encampased within this invention include, among other, 2,6-dimethylphenol, 2,6 - diethyl - 4 - methylphenol, 2,6 - di - iso-propyl - 4-methylphenol, 2,6 - di-tert - butylpenol, 2,6 - di - sec-butylphenol, 2,6 -1 di - cyclopropyl - 4 - hydroxyphenol, 2,6 - di - tert - butoxy - 4 - methylphenol, 2,6,4 - trimethoxyphenol, 2,6 - di - tert - butyl - 1 - hydroxybenzyl methyl ether, 2,6 - di - tert - butyl - 1 - hydroxybenzyl ethyl ether, 2,6 di - tert - butyl - 1 - hydroxybenzyl alcohol, 2,6 - di - tert - butyl - 4 - methylphenol, 2,6 - di-tert - butyl - 4 - ethylphenol, 2,6 - di - tert - butyl - 4-n - propylphenol, 2,4,6 - trimethylphenol, 2,4 - dimethyl-6 - tert - butylphenol, 2,4,6 - triisopropylphenol, 2,4,6-tri - tert - butylphenol, 2,4 - di - tert - amylphenol, 2,2'-bis(p - hydroxyphenyl) propane, 4,4' - iso - propylidenediphenol, 2,2' - methylene bis(4 - methyl - 6 - tert - butylphenol), p-dihydroxyphenol, p-methoxyphenol, p-benzyloxyphenol, p-ethoxyphenol, p-propoxyphenol, p-tert-butoxyphenol, bis(2 - hydroxy - 3 - tert - butyl - 5 - methylphenyl) methane, bis(3,5 - di - tert - butyl - 4 - hydroxyphenyl) methane, and the like.

The most preferred single alkylated phenols are: 2,6-di - tert - butyl - 4 - methylphenol and p - methoxyphenol. These alkylated phenols shows a synergistic effect in stabilizing the epsilon-caprolactones according to this invention. This synergistic effect will be disclosed more fully hereinafter in the ensuing examples.

The alkylated phenols used in this invention can be prepared by methods known in the art, e.g., the methods disclosed in J. Am. Chem. Soc. 75; 734–736 (1953), and U.S. Patents Nos. 2,838,571, 3,030,428, 3,085,003, and others.

The epsilon-caprolactones particularly suitable for stabilization according to this invention may be represented by the formula:

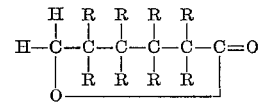

wherein R is either hydrogen or alkyl, with the proviso that when R is alkyl no more than four of the R's represent alkyl groups, the remainder being hydrogen atoms and the total number of carbon atoms in the alkyl groups does not exceed twelve.

Among the epsilon-caprolactones which can be stabilized according to this invention are:
epsilon-caprolactone;
alpha-methyl-epsilon-caprolactone;
beta-methyl-epsilon-caprolactone;
gamma-methyl-epsilon-caprolactone;
delta-methyl-epsilon-caprolactone;
alpha-ethyl-epsilon-caprolactone;
beta-ethyl-epsilon-caprolactone;
gamma-ethyl-epsilon-caprolactone;
delta-ethyl-epsilon-caprolactone;
alpha,beta-dimethyl-epsilon-caprolactone;

alpha,gamma-dimethyl-epsilon-caprolactone;
alpha,delta-dimethyl-epsilon-caprolactone;
beta,gamma-dimethyl-epsilon-caprolactone;
beta,delta-dimethyl-epsilon-caprolactone;
gamma,delta-dimethyl-epsilon-caprolactone;
beta,beta,delta-trimethyl-epsilon-caprolactone;
beta,delta,delta-trimethyl-epsilon-caprolactone;
alpha,beta,gamma-trimethyl-epsilon-caprolactone;
alpha,beta,delta-trimethyl-epsilon-caprolactone;
beta,gamma,delta-trimethyl-epsilon-caprolactone;
alpha-ethyl-beta-methyl-epsilon-caprolactone;
alpha-ethyl-gamma-methyl-epsilon-caprolactone;
alpha-ethyl-delta-methyl-epsilon-caprolactone;
beta-ethyl-alpha-methyl-epsilon-caprolactone;
beta-ethyl-gamma-methyl-epsilon-caprolactone;
beta-ethyl-delta-methyl-epsilon-caprolactone;
gamma-ethyl-alpha-methyl-epsilon-caprolactone;
gamma-ethyl-beta-methyl-epsilon-caprolactone;
gamma-ethyl-delta-methyl-epsilon-caprolactone;
delta-ethyl-alpha-methyl-epsilon-caprolactone;
delta-ethyl-beta-methyl-epsilon-caprolactone;
delta-ethyl-gamma-methyl-epsilon-caprolactone;
alpha,alpha-dimethyl-epsilon-caprolactone;
beta,beta-dimethyl-epsilon-caprolactone;
gamma,gamma-dimethyl-epsilon-caprolactone;
delta,delta-dimethyl-epsilon-caprolactone;
alpha,alpha,delta-trimethyl-epsilon-caprolactone;
beta,beta,gamma-trimethyl-epsilon-caprolactone;
alpha,delta,delta-trimethyl-epsilon-caprolactone;
beta,beta-dimethyl-gamma-ethyl-epsilon-caprolactone;
delta,delta-dimethyl-alpha-ethyl-epsilon-caprolactone.

Other lactones known in the art may also be stabilized according to this invention, e.g., delta-valerolactone, mono- and polyalkyl substituted delta-valerolactones, zeta-enantholactone, methyl-delta-valerolactone, and the like.

Of course, mixed isomers of epsilon-caprolactones, such as mixed isomers of methyl epsilon-caprolactone also may be stabilized according to this invention.

Representative combinations of triorgano phosphites and alkylated phenols suitable for stabilizing lactones according to this invention include, for example, tributyl phosphite and 2,6 - di- tert - butyl - 4 - methyl phenol, trioctyl phosphite and 2,6-di-tert-butyl-4-methyl phenol, tridecyl phosphite and 2,6-di-tert-butyl-4-methyl phenol, triphenyl phosphite and 2,6-di-tert-butyl-4-methyl phenol, phenyl didecyl phosphite and 2,6-di-tert-butyl-4-methyl phenol, tridecyl phosphite and bis(2-hydroxy-3-tert-butyl-5-methylphenyl) methane, tridecyl phosphite and bis(3,5-di-tert-butyl-4-hydroxyphenyl) methane, tridecyl phosphite and p-methoxyphenol, tributyl phosphite and p-methoxphenol, trioctyl phosphite and p-methoxyphenol, triphenyl phosphite and p-methoxyphenol, phenyl didecyl phosphite and p-methoxyphenol, and the like.

The concentration of triorgano phosphite and alkylated phenol to be incorporated in the epsilon-caprolactones in accordance with this invention can vary broadly, so long as it is a stabilizing amount. In general, a concentration of from about 10 to about 5000 parts per million each of triorgano phosphite and alkylated phenol is suitable. The preferred form of the invention consists of from about 100 to about 500 parts per million of alkylated phenol and from about 500 to about 1000 parts per million of triorgano phosphite incorporated in the epsilon-caprolactone. The most preferred form consists of from about 500 to 800 parts per million of triorgano phosphite and from about 100 to 200 parts per million of alkylated phenol incorporated in the epsilon-caprolactone. The most highly preferred form consists of about 800 parts per million of triorgano phosphite and 200 parts per million of alkylated phenol incorporated in the epsilon-caprolactone. Within the aforementioned range of from about 500 to about 800 parts per million parts of triorgano phosphite and from about 100 to about 200 parts per million parts of alkylated phenol there is clear evidence of synergism. A synergistic effect is readily apparent on comparison of the examples herein and will be discussed fully hereinafter.

The triorgano phosphite and alkylated phenol are added to the epsilon-caprolactone, preferably a freshly distilled epsilon-caprolactone, and mixed thoroughly. For optimum results the adding and mixing operation should be carried out in a glass container in a nitrogen atmosphere, although several containers of different constructions, that is, steel, stainless steel, and aluminum containers, may be used in place of a glass container. The atmosphere over the epsilon-caprolactone may also consist of air, natural gas (methane), or other inert vapors, although nitrogen is preferred. The triorgano phosphite and alkylated phenol can be mixed together and then added to the epsilon-caprolactone, or they can be added separately to said lactone.

By adding a mixture of triorgano phosphite, such as tridecyl phosphite, and an alkylated phenol, such as 2,6-di-tert-butyl-4-methyl-phenol, to a freshly distilled epsilon-caprolactone, excellent color stability and retardation of acid formation is achieved through the practice of this invention. Furthermore, no formation of peroxides is evidenced. The epsilon-caprolactone need not be freshly distilled; however, freshly distilled products generally will have greater stability.

The following examples illustrate the present invention.

EXAMPLE I

*Tridecyl phosphite*

To 100 grams of freshly distilled epsilon-caprolactone was added 0.10 gram (1000 parts parts per million parts) of tridecyl phosphite. The addition took place at a temperature of 25° C. in a glass container which had been previously purged with high-purity nitrogen. The freshly distilled epsilon-caprolactone contained less than 0.05 percent water, less than 1 part per million of peroxide (calculated as hydrogen peroxide), had a color of less than 10 Pt–Co, and an acid number of less than 0.10. The epsilon-caprolactone and tridecyl phosphite were mixed thoroughly.

The stability of the epsilon-caprolactone and tridecyl phosphite mixture was determined by immersing a sealed pressure bottle containing 50 grams of the sample into a steam bath that was operated at a temperature of 95°±4° C. After a period of approximately 40 hours, the bottle was removed and the color of the epsilon-caprolactone and tridecyl phosphite mixture was determined by ASTM Method D–1209–54 (Pt–Co). This mixture of epsilon-caprolactone and tridecyl phosphite had a color of 120 Pt–Co.

EXAMPLE II

*2,6-di-tert-butyl-4-methylphenol*

To 100 grams of freshly distilled epsilon-caprolactone was added 0.10 gram (1000 parts per million parts) of 2,6-di-tert-butyl-4-methylphenol. The addition took place at a temperature of 25° C. in a glass container which had been previously purged with high-purity nitrogen. The freshly distilled epsilon-caprolactone contained less than 0.05 percent water, less than 1 part per million of peroxide (calculated as hydrogen peroxide), has a color of less than 10 Pt–Co, and an acid number of less than 0.10. The epsilon-caprolactone and 2,6-di-tert-butyl-4-methylphenol were mixed thoroughly.

The stability of the epsilon-caprolactone and 2,6-di-tert-butyl-4-methylphenol mixture was determined by immersing a sealed pressure bottle containing 50 grams of the sample into a steam bath that was operated at a temperature of 95°±4° C. After a period of approximately 40 hours, the bottle was removed and the color of the epsilon-caprolactone and 2,6-di-tert-butyl-4-methyl phenol mixture was determined by ASTM Method D–1209–54 (Pt–Co). This mixture of epsilon-caprolactone and 2,6-di-tert-butyl-4-methylphenol had a color of 225 Pt–Co.

EXAMPLE III p-Methoxyphenol

To 100 grams of freshly distilled epsilon-caprolactone was added 0.10 gram (1000 parts per million parts) of p-methoxyphenol (monomethyl ether of hydroquinone). The addition took place at a temperature of 25° C. in a glass container which had been previously purged with high-purity nitrogen. The freshly distilled epsilon-caprolactone contained less than 0.05 percent water, less than 1 part per million of peroxide (calculated as hydrogen peroxide), had a color of less than 10 Pt–Co, and an acid number of less than 0.10. The epsilon-caprolactone and p-methoxyphenol were mixed thoroughly.

The stability of the epsilon-caprolactone and p-methoxyphenol mixture was determined by immersing a sealed pressure bottle containing 50 grams of the sample into a steam bath that was operated at a temperature of 95°±4° C. After a period of approximately 40 hours, the bottle was removed and the color of the epsilon-caprolactone and p-methoxyphenol mixture was determined by the Gardner method. This mixture of epsilon-caprolactone and p-methoxyphenol had a color of 2-Gardner.

EXAMPLE IV

Tridecyl phosphite and 2,6-di-tert-butyl-4-methylphenol

To 100 grams of freshly distilled epsilon-caprolactone was added 0.08 gram (800 parts per million parts) of tridecyl phosphite and 0.02 gram (200 parts per million parts) of 2,6-di-tert-butyl-4-methylphenol. The addition took place at a temperature of 25° C. in a glass container which had been previously purged with high-purity nitrogen. The freshly distilled epsilon-caprolactone contained less than 0.05 percent water, less than 1 part per million of peroxide (calculated as hydrogen peroxide), had a color of less than 10 Pt–Co, and an acid number of less than 0.10. The epsilon-caprolactone, 2,6-di-tert-butyl-4-methylphenol and tridecyl phosphite were mixed thoroughly.

The stability of the epsilon-caprolactone, tridecyl phosphite and 2,6-di-tert-butyl-4-methylphenol mixture was determined by immersing a sealed pressure bottle containing 50 grams of the sample into a steam bath that was operated at a temperature of 95°±4° C. After a period of approximately 40 hours, the bottle was removed and the color of the epsilon-caprolactone, tridecyl phosphite and 2,6-di-tert-butyl-4-methylphenol mixture was determined by ASTM Method D–1209–54 (Pt–Co) This mixture of epsilon-caprolactone, tridecyl phosphite and 2,6-di-tert-butyl-4-methylphenol had a color of 20 Pt–Co.

EXAMPLE V

Tridecyl phosphite and 2,6-di-tert-butyl-4-methylphenol

To 100 grams of freshly distilled epsilon-caprolactone was added 0.05 gram (500 parts per million parts) of tridecyl phosphite and 0.05 gram (500 parts per million parts) of 2,6-di-tert-butyl-4-methylphenol. The addition took place at a temperature of 25° C. in a glass container which had been previously purged with high-purity nitrogen. The freshly distilled epsilon-caprolactone contained less than 0.05 percent water, less than 1 part per million of peroxide (calculated as hydrogen peroxide), had a color of less than 10 Pt–Co and an acid number of less than 0.10. The epsilon-caprolactone, 2,6-di-tert-butyl-4-methylphenol and tridecyl phosphite were mixed thoroughly.

The stability of the epsilon-caprolactone, tridecyl phosphite and 2,6-di-tert-butyl-4-methylphenol mixture was determined by immersing a sealed pressure bottle containing 50 grams of the sample into a steam bath that was operated at a temperature of 95°±4° C. After a period of approximately 40 hours, the bottle was removed and the color of the epsilon-caprolactone, tridecyl phosphite and 2,6-di-tert-butyl-4-methylphenol mixture was determined by ASTM Method D–1209–54 (Pt–Co). This mixture of epsilon-caprolactone, tridecyl phosphite and 2,6-di-tert-butyl-4-methylphenol mixture had a color of 25 Pt–Co.

EXAMPLE VI

Tridecyl phosphite and p-methoxyphenol

To 100 grams of freshly distilled epsilon-caprolactone was added 0.05 gram (500 parts per million parts) of tridecyl phosphite and 0.05 gram (500 parts per million parts) of p-methoxyphenol. The addition took place at a temperature of 25° C. in a glass container which had been previously purged with high-purity nitrogen. The freshly distilled epsilon-caprolactone contained less than 0.05 percent water, less than 1 part per million of peroxide (calculated as hydrogen peroxide), had a color of less than 10 Pt–Co, and an acid number of less than 0.10. The epsilon-caprolactone and p-methoxyphenol were mixed thoroughly.

The stability of the epsilon-caprolactone, tridecyl phosphite and p-methoxyphenol mixture was determined by immersing a sealed pressure bottle containing 50 grams of the sample into a steam bath that was operated at a temperature of 95°±4° C. After a period of approximately 40 hours, the bottle was removed and the color of the epsilon-caprolactone, tridecyl phosphite and p-methoxyphenol mixture was determined by the Gardner method.. This mixture of epsilon-caprolactone, tridecyl phosphite and p-methoxyphenol had a color of 1-Gardner.

EXAMPLE VII

Tridecyl phosphite and 2,6-di-tert-butyl-4-methylphenol

To 100 grams of freshly distilled epsilon-caprolactone was added 0.02 gram (200 parts per million parts) of tridecyl phosphite and 0.08 gram (800 parts per million parts) of 2,6-di-tert-butyl-4-methylphenol. The addition took place at a temperature of 25° C. in a glass container which had been previously purged with high-purity nitrogen. The freshly distilled epsilon-caprolactone contained less than 0.05 percent water, less than 1 part per million of peroxide (calculated as hydrogen peroxide), had a color of less than 10 Pt–Co and an acid number of less than 0.10. The epsilon-caprolactone, 2,6-di-tert-butyl-4-methylphenol and tridecyl phosphite were mixed thoroughly.

The stability of the epsilon-caprolactone, tridecyl phosphite and 2,6-di-tert-butyl-4-methylphenol mixture was determined by immersing a sealed pressure bottle containing 50 grams of the sample into a steam bath that was operated at a temperature of 95°±4° C. After a period of approximately 40 hours, the bottle was removed and the color of the epsilon-caprolactone, tridecyl phosphite and 2,6-di-tert-butyl-4-methylphenol mixture was determined by ASTM Method D–1209–54 (Pt–Co). This mixture of epsilon-caprolactone, tridecyl phosphite and 2,6-di-tert-butyl-4-methylphenol had a color of 175 Pt–Co.

EXAMPLE VIII

No stabilizer 50 grams of freshly distilled epsilon-caprolactone having less than 0.05 percent water, less than 1 part per million of peroxide (calculated as hydrogen peroxide), a color of less than 10 Pt–Co and an acid number of less than 0.10 and containing no stabilizer was used as a blank. The stability of this epsilon-caprolactone was determined by immersing a sealed pressure bottle containing the 50 grams of epsilon-caprolactone into a steam bath that was operated at a temperature of 95°±4° C. After a period of approximately 40 hours, the bottle was removed and the color of this epsilon-caprolactone was determined by ASTM Method D–1209–54 (Pt–Co). This epsilon-caprolactone with no stabilizer had a color of 150 Pt–Co.

In the preceding examples, the lower the Pt–Co number the more stable is the composition or mixture. For example, a mixture with a color of 20 Pt–Co is ten times more color stable than one with a color of 200 Pt–Co. Also in the preceding examples, the lower the Gardner number the more stable is the composition or mixture. For example, a mixture with 2 Gardner is ten times more stable than one with a 20 Gardner. In the color tests employed in the examples, 1 Gardner is considered equivalent to 175 Pt–Co. The Gardner test method was employed in Examples III and VI, instead of the Pt–Co test method, because color too intense to be evaluated on Pt–Co scale.

It can be seen from the foregoing examples that in addition to mere stabilization, there is a stabilization based on synergism. For example, it can be seen that 1000 parts per million parts of 2,6-di-tert-butyl-4-methylphenol alone (Example II) gave a color of 225 Pt–Co and that 1000 parts per million parts of tridecyl phosphite alone (Example I) gave a color of 120 Pt–Co, whereas 500 parts per million parts each of 2,6-di-tert-butyl-4-methylphenol and tridecyl phosphite in combination (Example V) gave a color of 25 Pt–Co. The combined effect of the two stabilizers in combination is much more than the sum of their individual effects.

When using tridecyl phosphite and 2,6-di-tert-butyl-4-methylphenol in combination, it is preferred to use from about 100 to about 200 parts per million parts of 2,6-di-tert-butyl-4-methylphenol with from about 500 to about 800 parts per million parts of tridecyl phosphite.

The period of time that the epsilon-caprolactone will remain stable, when stabilized according to this invention, of course, varies with the circumstances and the conditions of storage. Epsilon-caprolactones stabilized according to this invention have remained stable for many months when stored at room temperature. Epsilon-caprolactones have remained stable for extended periods of time at temperatures from about 25° C., or lower, to about 100° C., or higher.

What is claimed is:
1. A stabilized composition of matter comprising an epsilon-caprolactone and, incorporated therein, a stabilizing amount of a triorgano phosphite of the formula

wherein R, R$^1$ and R$^2$ are each selected from the group consisting of alkyl, cycloalkyl, aryl, aralkyl, and alkaryl, each containing up to about 18 carbon atoms and an alkylated phenol of the formula

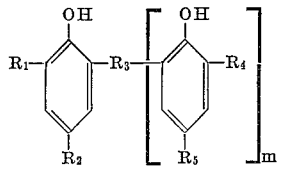

wherein R$_1$, R$_2$, R$_4$, and R$_5$ are each selected from the group consisting of hydrogen, alkyl, cycloalkyl, alkoxy, hydroxy, and hydroxyalkylene, each containing up to about 12 carbon atoms; $m$ has a value of from 0 to 1, inclusive; and R$_3$, depending upon the value of $m$, is selected from the group consisting of hydrogen, alkyl, alkylene, cycloalkyl, cycloalkylene, alkoxy, alkyleneoxy, hydroxy, and oxy, each containing up to about 12 carbon atoms, with the proviso that at least one of the aforementioned R$_1$ through R$_5$ must be alkyl or alkoxy.

2. A stabilized composition of matter comprising an epsilon-caprolactone of the formula

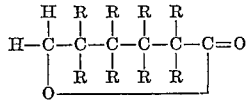

wherein R is selected from the group consisting of hydrogen and alkyl, with the proviso that when R is alkyl not more than four of the R's are alkyl, the remainder being hydrogen, and the total number of carbon atoms in each alkyl does not exceed twelve and a stabilizing amount of a trialkyl phosphite of up to about 18 carbon atoms in each alkyl and a 2,6-dialkyl-4-alkylphenol of up to about 12 carbon atoms in each alkyl incorporated therein.

3. A stabilized composition of matter comprising an epsilon-caprolactone and a stabilizing amount of tridecyl phosphite and 2,6-di-tert-butyl-4-methylphenol incorporated therein.

4. A stabilized composition of matter comprising an epsilon-caprolactone and a stabilizing amount of a trialkyl phosphite of up to about 18 carbon atoms in each alkyl and a p-alkoxyphenol of up to about 12 carbon atoms in alkoxy incorporated therein.

5. A stabilized composition of matter comprising epsilon-caprolactone and a stabilizing amount of tridecyl phosphite and 2,6 - di-tert-butyl-4-methylphenol incorporated therein.

6. A stabilized composition of matter comprising epsilon-caprolactone and a stabilizing amount of tridecyl phosphite and p-methoxyphenol incorporated therein.

7. The method of stabilizing an epsilon-caprolactone which comprises incorporating therein a stabilizing amount of a triorgano phosphite of the formula

wherein R, R$^1$, and R$^2$ are each selected from the group consisting of alkyl, cycloalkyl, aryl, aralkyl, and alkaryl, each containing up to about 18 carbon atoms and an alkylated phenol of the formula

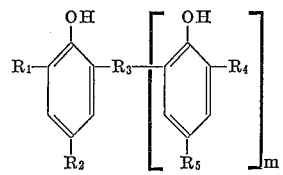

wherein R$_1$, R$_2$, R$_4$, and R$_5$ are each selected from the group consisting of hydrogen, alkyl, cycloalkyl, alkoxy, hydroxy, and hydroxyalkylene, each containing up to about 12 carbon atoms; $m$ has a value of from 0 to 1, inclusive; and R$_3$, depending upon the value of $m$, is selected from the group consisting of hydrogen, alkyl, alkylene, cycloalkyl, cycloalkylene, alkoxy, alkyleneoxy, hydroxy, and oxy, each containing up to about 12 carbon atoms, with the proviso that at least one of the aforementioned R$_1$ through R$_5$ must be alkyl or alkoxy.

References Cited by the Examiner

UNITED STATES PATENTS

| | | | |
|---|---|---|---|
| 2,652,416 | 9/1953 | Coover et al. | 260—461 |
| 2,844,582 | 7/1958 | Raley | 260—332.3 |
| 3,064,008 | 11/1962 | Phillips et al. | 260—343 |

OTHER REFERENCES

Denney et al.: Jour. Amer. Chem. Soc., vol. 82 (1960), pages 1393–5.

Lundberg: Autoxidation and Antioxidants, Interscience, New York (1961), pages 142, 143, 157 and 159–161.

WALTER A. MODANCE, *Primary Examiner.*

NICHOLAS S. RIZZO, *Examiner.*

J. A. PATTEN, *Assistant Examiner.*